(12) United States Patent
Glatfelter et al.

(10) Patent No.: US 10,114,670 B2
(45) Date of Patent: Oct. 30, 2018

(54) POINT-OF-USE-TOOLKIT

(71) Applicant: THE BOEING COMPANY, Huntington Beach, CA (US)

(72) Inventors: John William Glatfelter, West Chester, PA (US); Brian Dale Laughlin, Wichita, KS (US); Brian A. McCarthy, Snohomish, WA (US)

(73) Assignee: The Boeing Company, Chicago, IL (US)

( * ) Notice: Subject to any disclaimer, the term of this patent is extended or adjusted under 35 U.S.C. 154(b) by 86 days.

(21) Appl. No.: 14/731,657

(22) Filed: Jun. 5, 2015

(65) Prior Publication Data
US 2016/0357599 A1 Dec. 8, 2016

(51) Int. Cl.
G06F 9/48 (2006.01)

(52) U.S. Cl.
CPC .......... *G06F 9/4812* (2013.01); *G06F 9/4881* (2013.01)

(58) Field of Classification Search
None
See application file for complete search history.

(56) References Cited

U.S. PATENT DOCUMENTS

| | | | |
|---|---|---|---|
| 2004/0225573 A1* | 11/2004 | Ling ...................... | G06Q 10/08 705/26.1 |
| 2007/0150327 A1* | 6/2007 | Dromgold ......... | G06F 17/30551 705/7.17 |
| 2011/0022437 A1* | 1/2011 | Mundy .................. | G06Q 10/06 705/7.13 |
| 2011/0055891 A1* | 3/2011 | Rice ........................ | G06F 21/88 726/2 |
| 2015/0269508 A1* | 9/2015 | Damboritz ............. | G06Q 50/22 705/2 |
| 2015/0381687 A1* | 12/2015 | Lam ....................... | H04L 65/602 709/246 |
| 2016/0300178 A1* | 10/2016 | Perry ............... | G06Q 10/06311 |

* cited by examiner

*Primary Examiner* — Wynuel Aquino
(74) *Attorney, Agent, or Firm* — Womble Bond Dickinson (US) LLP

(57) ABSTRACT

An apparatus is provided for implementation of back-end system for providing point-of-use toolkits. The apparatus may receive an assignment of work tasks assigned to a technician for manufacture of a tangible product. In response, the apparatus may compile a point-of-use toolkit including comprehensive information regarding the work tasks, and transmit the point-of-use toolkit to a front-end system associated with the technician. The apparatus may determine an occurrence of a delay associated with the schedule that impacts the assignment of the one or more work tasks, and transmit information associated with the delay to the manufacturing scheduling system. In response to receiving an update to the assignment of the tasks from the manufacturing scheduling system, the apparatus may compile an update of the point-of-use toolkit, and transmit the update of the point-of-use toolkit to the front-end system.

18 Claims, 5 Drawing Sheets

POINT-OF-USE-TOOLKIT

TECHNOLOGICAL FIELD

The present disclosure relates generally to task information and scheduling systems for use in manufacturing processes and, in particular, to implementing task information and scheduling systems at the point-of-use for a user such as at a user's mobile device.

BACKGROUND

Large programs of manufacturing can be difficult to manage, particularly for complex products such as aircraft and automobiles that may include hundreds or thousands of parts and assemblies, and rely on hundreds of skilled technicians to manufacture, test, and ultimately deliver each aircraft. Therefore, complex schedules are developed to provide direction to the technicians on not only the task to be completed, but also a timeframe in which in the task should be completed. Once the technician is informed of an assigned task, the technician is required to search for the technical documentation necessary to complete the assigned task.

Manufacturers increasingly use digitally-based information systems for documentation. By way of example and not by way of limitation, such digitally-based information may include an endless number of aircraft maintenance manuals, parts catalogs and other documentation. For example, a company may have a library that includes many thousands of documents in a digital format. However, there may be no comprehensive index into the subject matter of the documentation and each document may be stored in independently accessible areas such that a manual search and retrieval of the documentation required to complete a work task becomes an extremely cumbersome and time-consuming task. This is a deficiency which detracts from the technicians allotted timeframe to actually complete the assigned task.

Additionally, current solutions record the time required to perform assembly operations inaccurately. The present system does not provide real-time updates in cases where an assigned task cannot be performed or assistance is required to perform the assigned task. For example, in one instance, a technician may be unable to complete an assigned task such as mounting a component to an aircraft, and a subsequent technician may be assigned a task to electrically connect the component, followed by another technician assigned to test the component, such that the inability to perform one assigned task may result in a cascade effect that causes other technicians to not be able to perform their assigned task. As a result, the technician's time is not being used effectively during the fabrication process as they are often left idle during this time period, and the time required to fabricate an aircraft may subsequently be increased.

Therefore, a need exist for a system that provides comprehensive task information and scheduling at the point of use of a technician during a manufacturing process in which the information is updated in real time to account for any instances that may alter a technicians ability to complete an assigned task.

BRIEF SUMMARY

Example implementations of the present disclosure are directed to an improved apparatus, method and computer-readable storage medium for a point-of-use toolkit. The present disclosure thus includes, without limitation, the following example implementations. In some example implementations, a method is provided for implementation of a back-end system for providing a point-of-use toolkit.

The method includes receiving an assignment of one or more work tasks of a work plan composed of a plurality of work tasks for manufacture of a tangible product, the one or more work tasks being assigned to a technician and received from a manufacturing scheduling system based on a schedule for performance of the plurality of work tasks. In response thereto, a point-of-use toolkit including comprehensive information regarding the one or more work task is compiled and transmitted to a front-end system associated with the technician. The method also includes determining an occurrence of a delay associated with the schedule that impacts the assignment of the one or more work tasks, transmitting information associated with the delay to the manufacturing scheduling system that in at least one instance causes the manufacturing scheduling system to update the assignment of the one or more tasks, and receiving the update to the assignment of the one or more tasks. In response thereto, a corresponding update of the point-of-use toolkit is compiled and transmitted to the front-end system associated with the technician.

In some example implementations of the method of the preceding or any subsequent example implementation, or any combination thereof, determining the occurrence of the delay includes determining the occurrence of the delay based on at least one of (i) user input received from the technician via the front-end system, or from another technician via another front-end system or (ii) information automatically retrieved from one or more of the manufacturing scheduling system, a manufacturing instructions library, a parts distribution database, or a tools distribution database.

In some example implementations of the method of any preceding or any subsequent example implementation, or any combination thereof, transmitting the update of the point-of-use toolkit includes causing the front-end system to alert the technician upon receipt of the updated point-of-use toolkit by the front-end system.

In some example implementations of the method of any preceding or any subsequent example implementation, or any combination thereof, compiling the point-of-use toolkit includes encoding the point-of-use toolkit in a format compatible with an operating system of the front-end system such that the point-of-use toolkit is viewable by the front end system, the point-of-use toolkit in different instances being encoded in different formats for front-end systems having different operating systems with which the respective different formats are compatible.

In some example implementations of the method of any preceding or any subsequent example implementation, or any combination thereof, compiling the point-of-use toolkit includes determining a role associated with the technician based at least in part on data retrieved from an application role database including technician roles' and certification data, and compiling the point-of-use toolkit based on the role associated with the technician, the toolkit in different instances including different comprehensive information regarding the one or more tasks for different technicians associated with different roles.

In some example implementations of the method of any preceding or any subsequent example implementation, or any combination thereof, compiling the point-of-use toolkit includes retrieving manufacturing instructions from a manufacturing instructions library, the manufacturing instructions including information that describe one or more activities of the one or more work tasks, and compiling the point-of-use toolkit, the comprehensive information of which includes the manufacturing instructions.

In some example implementations of the method of any preceding or any subsequent example implementation, or any combination thereof, the method further comprises determining a location of the front-end system, and restricting access to the point-of-use toolkit and the update thereof, via the front-end system, in an instance in which the location of the front-end system is outside a perimeter of an authorized work area associated with the one or more work tasks.

In some example implementations, an apparatus is provided for implementation of a system back-end system for providing a point-of-use toolkit. The apparatus comprises a processor and a memory storing executable instructions that in response to execution by the processor cause the apparatus to at least perform the method of any preceding example implementation, or any combination thereof. This may include implementation of subsystems of the system, such as a loading and synchronization system, schedule interruption system, security system, and/or device compatibility system configured to perform the steps of the method.

In some example implementations, a computer readable storage medium is provided for providing a point-of-use toolkit. The computer-readable storage medium is non-transitory and has computer-readable program code portions stored therein that, in response to execution by a processor, cause an apparatus to at least perform the method of any preceding example implementation, or any combination thereof.

These and other features, aspects, and advantages of the present disclosure will be apparent from a reading of the following detailed description together with the accompanying drawings, which are briefly described below. The present disclosure includes any combination of two, three, four or more features or elements set forth in this disclosure, regardless of whether such features or elements are expressly combined or otherwise recited in a specific example implementation described herein. This disclosure is intended to be read holistically such that any separable features or elements of the disclosure, in any of its aspects and example implementations, should be viewed as intended, namely to be combinable, unless the context of the disclosure clearly dictates otherwise.

It will therefore be appreciated that this Brief Summary is provided merely for purposes of summarizing some example implementations so as to provide a basic understanding of some aspects of the disclosure. Accordingly, it will be appreciated that the above described example implementations are merely examples and should not be construed to narrow the scope or spirit of the disclosure in any way. Other example implementations, aspects and advantages will become apparent from the following detailed description taken in conjunction with the accompanying drawings which illustrate, by way of example, the principles of some described example implementations.

BRIEF DESCRIPTION OF THE DRAWING(S)

Having thus described example implementations of the disclosure in general terms, reference will now be made to the accompanying drawings, which are not necessarily drawn to scale, and wherein:

DETAILED DESCRIPTION

Figure 1:
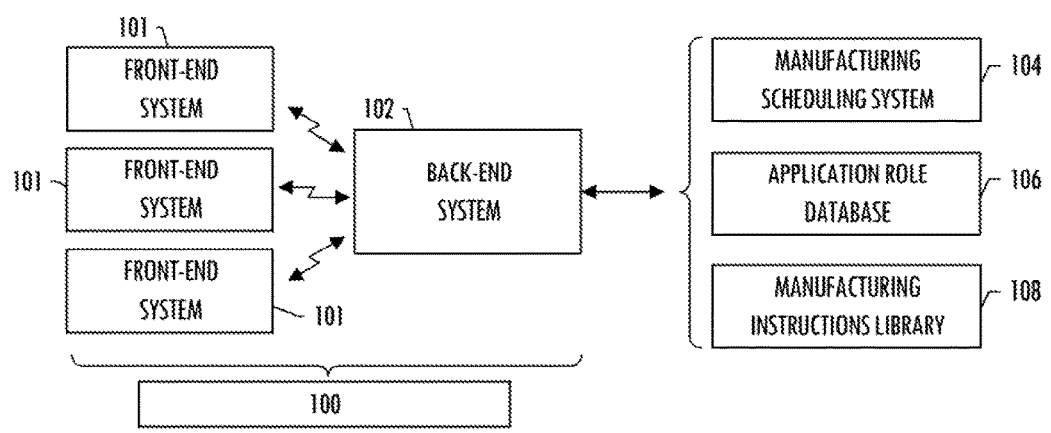
FIG. 1 is an illustration of a point-of-use toolkit system according to example implementations of the present disclosure.

Some implementations of the present disclosure will now be described more fully hereinafter with reference to the accompanying drawings, in which some, but not all implementations of the disclosure are shown. Indeed, various implementations of the disclosure may be embodied in many different forms and should not be construed as limited to the implementations set forth herein; rather, these example implementations are provided so that this disclosure will be thorough and complete, and will fully convey the scope of the disclosure to those skilled in the art. Like reference numerals refer to like elements throughout.

Example implementations of the present disclosure are generally directed to task information and scheduling systems for use in manufacturing processes and, in particular, to implementing task information and scheduling systems at the point-of-use for a user, worker, engineer, technician or the like (generally referred to herein as a "technician"). FIG. 1 illustrates a point-of-use toolkit system 100 according to example implementations of the present disclosure. The point-of-use toolkit system may include one or more of each of a number of subsystems (each an individual system) such as, for example, one or more front-end systems 101 coupled to a back-end system 102. The front-end system and back-end system may be coupled by wire or wirelessly, directly or over one or more networks. In some examples, the front-end system and back-end system may be integrated into a single component configured to perform the operations of both the front-end system and back-end system.

As also shown in FIG. 1, the back-end system 102 may be coupled to one or more resource host systems. Examples of suitable resource host systems may generally include software-based systems and appropriate storage accessible by an electronic resource, such as file storage, database storage, cloud storage and the like. Examples of suitable software-based systems (electronic resources) include information systems, computer-aided design (CAD) systems, and the like. Examples of suitable information systems may include data warehouses, resource planning systems, geographic information systems, global information systems, and the like.

More particularly, as shown, the resource host systems may include a manufacturing scheduling system 104, application role database 106 and/or manufacturing instructions library 108. Similar to the front-end system 101 and back-end system, the back-end system and resource host systems may be coupled by wire or wirelessly, directly or over one or more networks. In some examples, the back-end system and one or more resource host systems may be integrated into a single component configured to perform the operations of the back-end system and resource host system(s). Similarly, in some examples, two or more resource host systems may be integrated into a single component configured to perform the functions of the respective resource host system(s).

The front-end system 101 may be generally configured to receive and display point-of-use toolkits in a format that is viewable by a technician. The front-end system may also be generally configured to transmit information provided by the technician to the back end system 102. In some examples, the front-end system may comprise, include or be embodied in a point-of-use device. And in some examples, the point-of-use device may comprise, include or be embodied in a mobile computing device such as a smartphone, tablet computer, wearable technologies, and the like.

The back-end system 102 may be generally configured to receive an assignment of work tasks included in a work plan for manufacture of a tangible product, such as an aircraft or other vehicle, or any of a number of other manufactured products. In an example implementation, the work tasks are assigned to a technician and received from the manufacturing scheduling system 104 based on a schedule for performance of a plurality of work tasks. The back-end system 102 may then compile a point-of-use toolkit that includes comprehensive information regarding the work tasks, and transmit the point-of-use toolkit to a front-end system 101 associated with the technician. The comprehensive information may be or include at least a minimum amount of information necessary to enable the completion of a work task. To this extent, the comprehensive information may include less than the totality of required information for completion of a task. In one example implementation the comprehensive information includes manufacturing instructions that describe one or more activities of work task using textual and graphic information. The back-end system 102 may also serve as the communication and visibility connection point and/or hub for alterations related to scheduling and general information including revisions and/or updates to work task instructions, drawings, and the like. Any communication regarding said changes may be received from the back-end system.

The back-end system 102 may be further configured to update and subsequently compile a corresponding update of the initially transmitted point-of-use toolkit in response to determining the occurrence of a schedule delay that impacts the assignment of the work tasks and transmitting information associated with the delay to the manufacturing scheduling system 104. Specifically, after transmitting the delay information and receiving an update to the assignment of the work tasks from the manufacturing scheduling system 104, the back-end system may be configured to compile an update of the point-of-use toolkit based on the update to the assignment of the tasks, and transmit the corresponding update of the point-of-use toolkit to the front-end system 101.

The manufacturing scheduling system 104 may be generally configured to maintain a schedule for performance of the work tasks of the work plan, provide assignments of tasks to various technicians over the course of the schedule, collect actuals (the time it actually took the technician to complete the task), and determine delays in the schedule based on the work plan. The point-of-use toolkit system 100 is configured to provide a technician with an assigned task at the location of the assigned task. In one example implementation, the point-of-use system first provides a technician access to the manufacturing scheduling system 104 in which the access may be provided at the location in which information would be directly utilized by the technician to complete a work task. Geo-positioning of the device may enable filtering tasks from the scheduling system relevant to the location and allowing manufacturing safety programs to monitor employees working in hazardous locations (e.g., confined spaces, areas with hazardous chemicals, and the like).

The application role database 106 may be generally configured to maintain technician roles' and certification data for various technicians. The application role database may manage access to metadata regarding a plurality of technicians associated with the manufacturing scheduling system 104. In particular each of the plurality of technicians may be assigned a unique identifier such that work task are only delivered to qualified personnel. In one example implementation, a technician may be assigned one or more roles in which the roles may be or include an electrician, composite specialist, engine mechanic, sealer, inspector, and/or the like. The application role database may be further configured to maintain a record of expiration for each technician's qualifications and/or certifications, and in particular, the application role database may be configured to maintain certification currency metadata for each technician associated with the manufacturing scheduling system. This point-of-use information may also be determined by signals from Parts, tools, location, other mechanics, geographic location, spatial positioning, and of other information that identify intention, and/or may provide auto filtering of data based on the presence (or lack thereof), convergence and/or divergence of items needed in order to accomplish specific tasks.

The manufacturing instruction library 108 may be or include a repository of information for work tasks that may be performed as part of a work plan to manufacture or produce a tangible product. For a work task, this information may include, for example, work instructions including one or more directives for one or more technicians to perform one or more activities to complete the work task. In some examples, the information may also include textual and/or graphic information that describe, detail and/or illustrate one or more of the activities of the work task. In some examples, the manufacturing instruction library may be populated and/or maintained though a manufacturing execution system or another master database provided by a manufacturer or third-party associated with a manufacturer.

Figure 2:
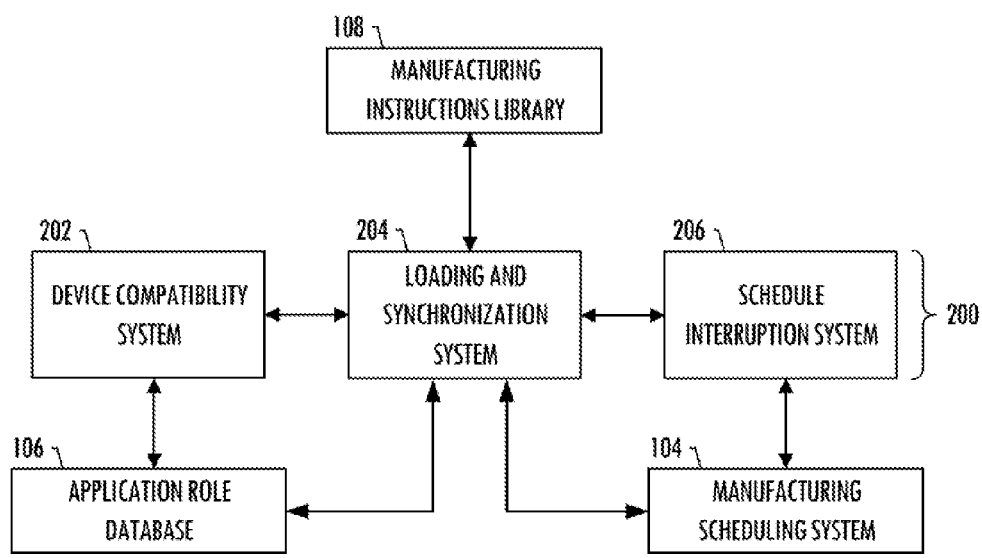
FIG. 2 is an illustration of a back-end system according to one example implementation.

FIG. 2 illustrates a back-end system 200 that may be one example of the back-end system 102 of the point-of-use toolkit system 100 of FIG. 1. The back-end system may include one or more of each of any of a number of different subsystems (each an individual system) for performing one or more functions or operations to facilitate providing information at the point-of-use of a technician. As shown, for example, the back-end system may include a device compatibility system 202, loading and synchronization system 204, and/or schedule interruption system 206. It should be understood that while the device compatibility system, loading and synchronization system, and schedule interruption system are shown as part of the back-end system, one or more of the respective systems may instead be separate from but in communication with the back-end system or even the front-end system and host resource systems. Further, it should be understood that one or more of the subsystems may function or operate as a separate system without regard to others of the subsystems. And it should be understood that the back-end system may include one or more additional or alternative subsystems than those shown in FIG. 2.

Figure 3:
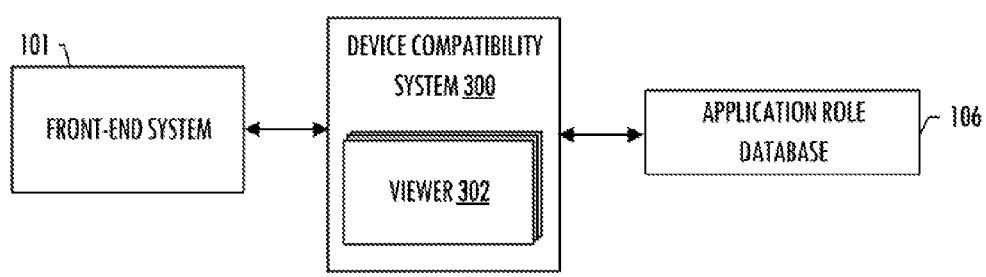
FIGS. 3, 4 and 5 illustrate respectively a device compatibility system, loading and synchronization system, and schedule interruption system, in accordance with example implementations.
Figure 4:
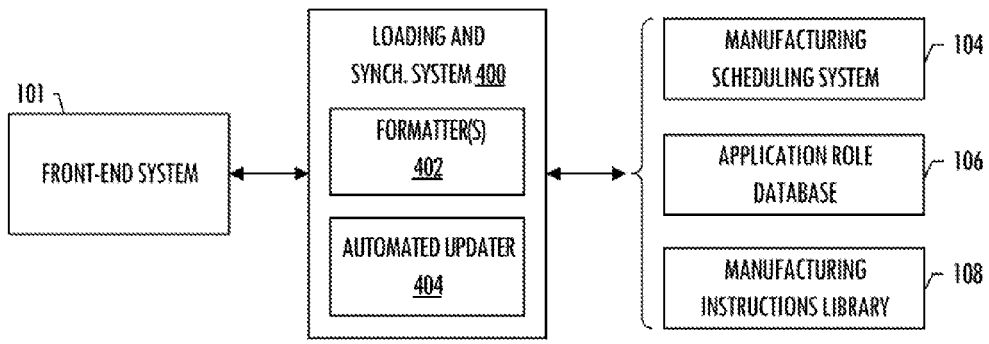
Figure 5:
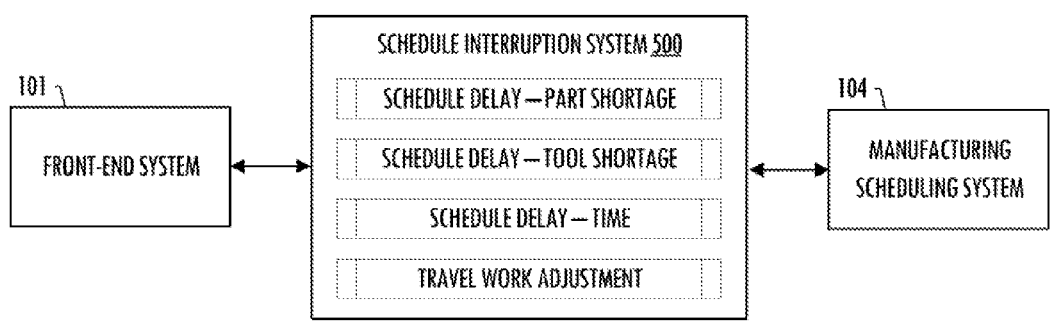

As explained in greater detail below, the device compatibility system 202 may be generally configured to enable one or a plurality of front-end systems 101, which may include the mobile device(s) of one or more technicians, to be compatible with a common point-of-use toolkit for the purpose of receiving and viewing information toolkits, and exchanging manufacturing-related information amongst the various devices. The loading and synchronization system 204 may be generally configured to initially load point-of-use toolkits on a mobile device and additionally update point-of-use toolkit at the mobile device based on external factors such as scheduling delays received from the schedule interruption system 206. The schedule interruption system 206 may be generally configured to receive indication of schedule interruptions and process the schedule interruptions such that the associated master schedule is subsequently updated and communicated to the assigned technician(s). Reference will now be made to FIGS. 3, 4, and 5, which illustrate more particular examples of a suitable device compatibility system, loading and synchronization system, and schedule interruption system, respectively, according to example implementations of the present disclosure.

FIG. 3 illustrates a device compatibility system 300 that may be one example of the device compatibility system 202 of the back-end system 200 of FIG. 2. The device compatibility system 300 may be coupled to one or more front-end systems 101 (e.g., point-of-use devices). The device compatibility system may be generally configured to enable a plurality of front-end systems to be compatible with a common point-of-use toolkit for the purpose of receiving and viewing the toolkit, and exchanging manufacturing-related information amongst the various front-end systems. For example, the device compatibility system may facilitate loading a front-end system with user interface viewing software that enables the front-end system to receive and view information compiled within a point-of-use toolkit.

As shown, the device compatibility system 300 may include a number of viewers 302 that provide a platform for receiving and displaying information toolkits at the point-of-use of a work task. Displaying a toolkit on a front-end system 101 may comprise providing the front-end system with access to one or more resource host systems that contain the necessary scheduling information, task instructions, and documentation required for completing a work task. As such, the viewer 302 may be or include an application, software, and/or platform configured for enabling access to the various systems and subsystems disclosed herein. In one example implementation, the viewer is embodied by a mobile application that is maintained and executed on a mobile device or accessible via a web browser.

In some example implementations, providing access to the resource host systems via the front-end system 101 may first include association of the front-end system with a compatible viewer 302. To this extent, the device compatibility system 300 may first load the front-end system with a compatible viewer, or general user interface viewing software, in which the user interface viewing software provides a means for receiving point-of-use toolkits via a front-end system and viewing the information contained therein via a display associated with the front-end system. Loading a front-end system with a viewer may include the local installation of an application on the front-end system and/or providing temporary access to a user interface viewing software through a web-based application or web browser executed on the front-end system. In addition to providing point-of-use toolkits, the viewer may additionally enable collaboration amongst various technicians associated with an individual and/or collection of work task. In this way, the viewer may be configured to implement audio, video, and/or imaging capabilities such that the system is configured to facilitate at least one of an audio, video, and/or image collaboration between a plurality of technicians associated with any given work task.

In some example implementations, the point-of-use toolkit system 100 may be configured to authenticate the front-end system 101 and/or the identity of the technician having the front-end system in their possession prior to providing access to the subsystems, viewer, and/or toolkits. For example, in one example implementation, authentication of the front-end system may be required prior to establishing a secured networked connection between the front-end system and the back-end system. In another example, user authentication may be required by the technician prior to granting access to the viewer and/or user specific toolkits for an assigned task. In doing so, the system may be required to receive login credentials from a user (technician) via a communication interface associated with the front-end system, and in response to receiving and verifying the validity of the login credentials, the front-end system and/or user's identity may be authenticated. Examples of suitable credentials include a user name, password, personal identification number (PIN), remote frequency identifier (RFID), biometric screening, and the like.

In some example implementations, the point-of-use toolkit system 100, and more specifically, the back-end system 200 may further include a security system configured to utilize increased levels of security such as a two-factor authentication process based on the sensitivity of the information being accessed. The system may be further configured to sense and/or evaluate environmental or contextual security indicators as a means of authentication and ensuring security of the information contained within the point-of-use toolkits. The environmental or contextual security indicators may include, but not be limited to, elements such as time, co-location with tools, objects, manufacturing information, and the like. For example, the system may be configured to restrict viewing access in response to determining that the technician is outside the location of an authorized work area.

In some example implementations, the security system may further incorporate one or more safety methods to prevent fraudulent attempts to access the point-of-use toolkits. For example, in response to detecting a predetermined number of invalid login attempts, the system may be configured to automatically delete any previously received point-of-use toolkits that have been locally stored on a front-end system 101 or are temporarily accessible via the front-end system. For example, the system may be configured to prevent unauthorized access by automatically deleting received point-of-use toolkits after three (3) unsuccessful login attempts.

FIG. 4 illustrates a loading and synchronization system 400 that may be one example of the loading and synchronization system 204 of the back-end system 200 of FIG. 2. As illustrated, the loading and synchronization system 400 may be coupled to one or more front-end systems 101 (e.g., point-of-use devices). The loading and synchronization system may be configured to communicate directly with the front-end system, the manufacturing scheduling system 104, the application role database 106, and the manufacturing instruction library 108 for the purpose of initially providing and/or updating scheduling information and exchanging information related to task assignments and completion statuses.

As suggested above, the loading and synchronization system 400 may be generally configured to receive an assignment of work tasks from a manufacturing scheduling system 104, initially load a point-of-use toolkit related to a user-specific work task on a technician's front-end system 101, and update the point-of-use toolkits based on factors such as scheduling delays received from the schedule interruption system 206. For example, the loading and synchronization system may facilitate periodically loading and/or syncing the front-end system with updated point-of-use toolkits for utilization in performing a work task. The point-of-use toolkits may be task specific such that a toolkit is only provided to the technician assigned to the related work task. In this way, the loading and synchronization system may utilize data inputs and/or retrieve data from one or more databases such as the application role database 106 and the manufacturing instruction library 108 for use in determining the appropriate toolkit to be loaded onto a technician's front-end system. The loading and synchronization system may also receive user input from a technician via the front-end system. The user input may indicate pertinent information such as the completion status of a work task.

As shown, the loading and synchronization system 400 may include a number of formatters 402 that format the toolkits to be displayed at a front-end system 101, and an automated updater 404 configured to provide updates for the point-of-use toolkits. The loading and synchronization system may determine and/or identify a specific work task, from amongst a received assignment of work tasks, which has been scheduled to be completed by a technician associated with the authorized front-end system and thus having the front-end system in his or her possession. In example implementations, the determination is made at least in part on data that has been retrieved from the manufacturing scheduling system 104. The determination may additionally be made based on data retrieved from one or more supplemental data sources such as the application role database 106 and manufacturing instruction library 108. For example, the retrieved data may be or include technician role descriptions, technician certifications and/or credentials, explicit indication of the technician assigned to complete a work task (e.g. name, job title, and the like), and the like. In this way, work tasks may be matched with technicians' based on the technician's identified role, certifications, and the like.

In response to identifying the work task that has been scheduled to be completed by the technician, the loading and synchronization system 400 may then compile a point-of-use toolkit that is associated with the scheduled task. In this way, the point-of-use toolkit may include comprehensive information that is required to complete a scheduled task such as fabrication, assembly, maintenance, repair, and overhaul associated with a manufactured aircraft. Compiling the information kit may first comprise retrieving the required task information from a plurality of data sources. The toolkit may include, but not be limited to, a list of the required steps and/or operations to perform the assigned task, related drawings, and/or any additional documentation required by the technician to perform the assigned task. To this extent, the point-of-use toolkit may be embodied by the information necessary to complete a work task in an optimized and/or efficient manner.

In one example implementation, compiling the point-of-use toolkit includes the loading and synchronization system 400 being configured to determine a role associated with the technician based at least in part on data retrieved from an application role database 106 and compiling the point-of-use toolkit based on the role associated with the technician such that the toolkit includes different comprehensive information regarding the work task(s) for different technicians associated with different roles. For example, if a first technician is a certified electrician and a second technician is a skilled laborer, the certified technician may be provided with detailed schematics regarding the completion of a task to wire an electrical component, and the skilled laborer may be provided a general diagram for connecting the electrical component after it has been properly wired.

In one example implementation, compiling the point-of-use toolkit includes the loading and synchronization system 400 being configured to retrieve manufacturing instructions regarding a work task from the manufacturing instructions library and compiling the point-of-use toolkit based on the manufacturing instructions regarding the work task(s) such that the comprehensive information regarding the work task(s) includes the manufacturing instructions regarding the work task(s). Information compiled within the point-of-use toolkit may also be determined by signals from parts, tools, locations, other mechanics, geographic locations, and/or spatial positions that may inform intention and provide auto filtering of data based on the presence, convergence, and/or divergence of information in accomplishing specific work tasks.

In some example implementations, compiling the point-of-use toolkit may further comprise the loading and synchronization system 400 being configured to encrypt the data included in the point-of-use toolkit prior to transmission to a plurality of front-end systems. The data may be encrypted using various methods including but not limited to, hashing, symmetric encryption, asymmetric encryption, and the like. In one example implementation, in which the data is encrypted using symmetric and/or asymmetric encryption, a key may be utilized to encrypt the point-of-use toolkit such that a technician is subsequently required to provide the encryption key in order to decrypt the toolkit upon retrieval and receive access to the data compiled therein.

In some example implementations, compiling the point-of-use toolkit may optionally comprise the loading and synchronization system 400 being configured to compress the data included in the point-of-use toolkit prior to transmission to a plurality of point-of-use toolkit. As such, the compressed data may optimize the process of transmitting new and/or updated toolkits by decreasing the volume of data traffic thereby decreasing the total update time. To this extent, one or more data compression algorithms may be utilized by the system in order to ensure efficient data transmission.

In one example implementation, the viewer 302 and/or point-of-use toolkit may be developed according to a ubiquitous architecture that is operating system independent and thus configured for compatibility with various operating systems. In such an example implementation, the formatter 402 of the loading and synchronization system 400 may be configured to utilize a specific point of use information kit language (PIKL) when encoding the point-of-use information kit. The PIKL may be structured such that manufacturing instructions, toolkits and related contents included therein are formatted in a unique and unambiguous configuration that is viewable on any front-end system regardless of the operating system type. Specifically, the PIKL may utilize an extensible markup language (XML) which compiles with numerous ISO standards and thus provides a generic XML syntactical language that is configured to be compatible with any front-end system and/or operating system. Content delivered in the PIKL structure may include one or more work packages in which each work package include all pertinent graphics (CAD data), text, and supporting data. The data may be provided in a variety of formats including video, audio, and/or other formats suitable in presenting information for completing work task.

In an alternative example implementation, the viewer 302 and/or transmitted point-of-use toolkits are device specific and accordingly compatible with a single operating system and/or architecture maintained on the front-end system 101. As such, the loading and synchronization system 400 may be configured to encode the point-of-use toolkit in different formats for front-end systems having different operating systems with which the respective different formats are compatible such that the point-of-use toolkit is viewable by each respective front-end system. In such an example implementation, when encoding the point-of-use toolkits, the formatter 402 of the loading and synchronization system is configured to determine an operating system type associated with the front-end system, and encode the point-of-use toolkit based at least in part on a programming language associated with the front-end system operating system type.

The loading and synchronization system 400 may be configured to provide the ability to download toolkits corresponding to a predetermined number of days at the front-end system 101. In this way, compiling the point-of-use toolkit may comprise compiling information for a predetermined period of time (e.g. hours, days, weeks, months, quarters, and the like). For example, a single day's worth of work may be compiled into an individual toolkit such that the point-of-use toolkit is configured to provide a schedule indicating one day of work.

In an alternative example implementation, the loading and synchronization system 400 may be configured to provide the ability to download toolkits at the front-end system 101 for a predetermined number of tasks. In some example implementations, compiling the point-of-use toolkit comprises compiling information for a predetermined number of tasks. In this way, the information kit may be compiled such that the period of time associated with the information kit directly reflects the time frame required to complete the work tasks. For example, a toolkit that is compiled for two work tasks may correspond to a week's work of work.

Once the point-of-use toolkit has been compiled, the loading and synchronization system 400 may then be configured to transmit the point-of-use toolkit such that it is received by the front-end system 101 of the technician. As suggested above, the system may be configured to provide the ability to download toolkits for a predetermined number of days at the front-end system such that in some example implementations, transmitting and/or receiving the point-of-use toolkits comprises transmitting one or more point-of-use toolkits in bundles based at least in part on a predetermined period of time (e.g. hours, days, weeks, months, quarters, and the like). For example, a day's worth of work may be transmitted at a single time such that one or more toolkits are configured to provide a schedule indicating one day of work.

In an alternative example implementation, the loading and synchronization system 400 may be configured to provide the ability to download task specific toolkits at the front-end system 101 such that in some example implementations, transmitting and/or receiving the point-of-use toolkits comprises transmitting the toolkits based at least in part on a predetermined task or a predetermined number of tasks. For example, the device may be configured to receive one to two tasks at a given time, and may additionally require completion of the tasks associated with the received toolkits prior to transmission and/or retrieval of toolkits related to newly assigned work task. In one example implementation, the point-of-use toolkits may be transmitted and/or accessible based on a priority of completion associated with the related task. For example, if a technician originally receives a tool kit related to a primary assigned work task and the technician subsequently receives a toolkit related to an emergency task, the system may be configured to automatically restrict access to the initially received toolkit until completion of the emergency work task. In this way, in addition to providing scheduling information, the system may be further configured to facilitate prioritization at which task are completed by technicians.

The loading and synchronization system 400 is configured to receive user input from a technician at the point of use such that point-of-use toolkits and related components are updated in real time via the automated updater 404. As such, the system enables a technician to enter information in real-time that allows for subsequent update of the point-of-use toolkits in real time and reassignment of personnel as necessary. To this extent, the automated updater 404 may provide each technician that is affected by a schedule change with a new and/or revised toolkit that accounts for the delay input by another technician or automatically determined by the system. In this way, the automated updater 404 may be configured to push updates to the front-end system on a periodic and/or continuous basis. Specifically, the loading and synchronization system is configured to receive an update to the assignment of the task(s) from the manufacturing scheduling system and compile a corresponding update of the point-of-use toolkit based on the update to the assignment of the task(s), and subsequently transmit the corresponding update of the point-of-use toolkit to the front-end system.

In some example implementations, the loading and synchronization system 400 may be further configured to implement one or more alerts indicating the occurrence of a newly received point-of-use toolkit associated with a recently assigned task and/or indicating the occurrence of a scheduling update or updated point-of-use toolkit associated with a previously assigned task. In such an example implementation, the system may be configured to transmit the updated point-of-use toolkit to one or more front-end systems 101 such that transmitting the updated toolkit comprises the loading and synchronization being configured to cause the front-end system to alert the technician upon receipt of the updated point-of-use toolkit by the front-end system. The alerts may be received directly on the front-end system via the viewer or received via another messaging method (e.g. text message, multimedia message, email message, automated phone call, and the like).

In addition to directly updating the point-of-use toolkits, the automated updater 404 may be further configured to update the status of one or more tasks that are related to any given point-of-use toolkit. In such an example implementation, a technician may provide user input to indicate the current status of a task. For example, the task status may include, but not be limited to, pending, completed, delayed, ongoing, and the like. The technician may further provide a description of the task status. In some example implementations, the point-of-use system may automatically detect the status of a work task based on sensors configured to provide sensed input characteristics of a user, the user's environment or the user's interaction with their environment. For example, the point-of-use toolkit may be configured to receive input from a wearable device worn by the technician and configured to determine the current status of a work task. In one example implementation, the system may be configured to receive indication of a completed work task, and in response to receiving indication of the completed work task, the automated updater 404 may automatically update the status of the work task. Receiving indication of a completed work task may further comprise automatically removing the point-of-use toolkit from the device after the task has been completed.

The loading and synchronization system 400 may further ensure the accuracy of task scheduling by associating time stamps with the toolkits and/or individual task related to the toolkits. The time stamps may be or include embedded data provided within a toolkit, visual identifiers viewable within the viewer, manufacturer log entries, and the like. In one specific example implementation, a time stamp is assigned in response to the commencement of an assigned task. In such an example implementation, the system is configured to receive indication of a commenced work task via user input from the technician, and in response to receiving indication of the commenced task, time stamp the point-of-use toolkit such that the time stamp indicates a time at which the work task was initiated. In another specific example implementation, a time stamp is assigned in response to the completion of an assigned task. In such an example implementation, the system is configured to receive indication of a completed work task via user input from the technician, and in response to receiving indication of the completed task, time stamp the point-of-use toolkit such that the time stamp indicates a time at which the work task was completed.

FIG. 5 illustrates a schedule interruption system 500 that may be one example of the schedule interruption system 206 of the back-end system 200 of FIG. 2. The schedule interruption system 500 may be generally configured to receive indication of schedule interruptions and process the schedule interruptions such that the associated master schedule is subsequently updated and communicated to the assigned technician(s). Specifically, the schedule interruptions system 500 may determine an occurrence of a delay associated with a schedule that impacts the assignment of the work task(s), and transmit information associated with the delay to the manufacturing scheduling system 104. The schedule interruption system 500 may be configured to the occurrence of a delay based on at least one of user input received from the technicians' via a front-end system or information automatically retrieved from one or more of the manufacturing scheduling system 104, a manufacturing instructions library 108, parts distribution databases, tools distribution databases, and the like.

As illustrated, the schedule interruption system 500 may be coupled to one or more front-end systems 101 (e.g., point-of-use devices), which in some examples may be configured to implement the front-end system 101 of the point-of-use toolkit system 100 of FIG. 1. As such, the schedule interruption system 500 may be configured to communicate directly with a front-end system for the purpose of receiving and/or transmitting scheduling delay information. The schedule interruption system 500 may be further configured to communicate directly with the manufacturing master scheduling database 104 or other resource host systems to facilitate the adjustment of scheduling based on inadvertent delays and/or interruptions such as part shortages, tool shortages, time delays, traveled work adjustments, and the like. The scheduling delay information may be initially communicated to the manufacturing master scheduling database 104 and subsequently routed to the front-end system via the loading and synchronization system 204.

In such an example implementation, the schedule interruption system 500 may be configured to determine a scheduling delay associated with the work task based at least in part on user input received from a first technician, and in response to determining the scheduling delay, transmit interruption information related to the delay to the manufacturing scheduling system 104. For example, the schedule interruption system 500 is configured to receive user input from a technician via a front-end system that may indicate pertinent information such as an inadvertent delay of their assigned task completion. In some example implementations, the schedule interruption system 500 is configured to further categorize the received input as specific delay type. For example, as shown, the input may be categorized as one or more scheduling delays or a travel work adjustment.

Similarly in some example implementations, scheduling delays may be determined independent of explicit user input by a technician. For example, a scheduling delay may be based on a tool shortage in which a parts, tools, and/or supplies database connected to the system may indicate the occurrence of a tool shortage. In such an example implementation, the scheduling interruption system 500 may be configured to automatically determine the occurrence of a delay associated with the work task based at least in part on a data source (e.g. a database), and in response to determining the occurrence of the delay, transmit information associated with the delay to the manufacturing scheduling system 104.

The manufacturing scheduling system 104 may then transmit one or more scheduling updates and/or updates to the assignment of work tasks to the loading and synchronization system 202 such that the point-of-use toolkit is automatically updated at the front-end system 101 to reflect the delay. The updated point-of-use toolkit may then be transmitted, by the loading and synchronization system 400, to a plurality of other technicians associated with the assigned work task or collection of work task. In this way, each technician can receive real time scheduling information at the point of use thereby altering the conventional process for providing scheduling information and reducing and/or eliminating the time spent at a remote location in order to directly access or download scheduling information. The system is configured to increase the accuracy of a master scheduling plan by precisely tracking the time required to complete each individual work task and therefore resulting in the development of more accurate task schedules overall. In one example implementation, only toolkits that are updated due to specific reasoning (e.g. parts, tools, schedule, traveled work, or engineering updates) are retransmitted. In addition, in such an example implementation only work tasks that the technician is certified to complete (e.g. validated credentials and/or current training certification) are updated or initially transmitted to the technician at the point of use device.

Figure 6:
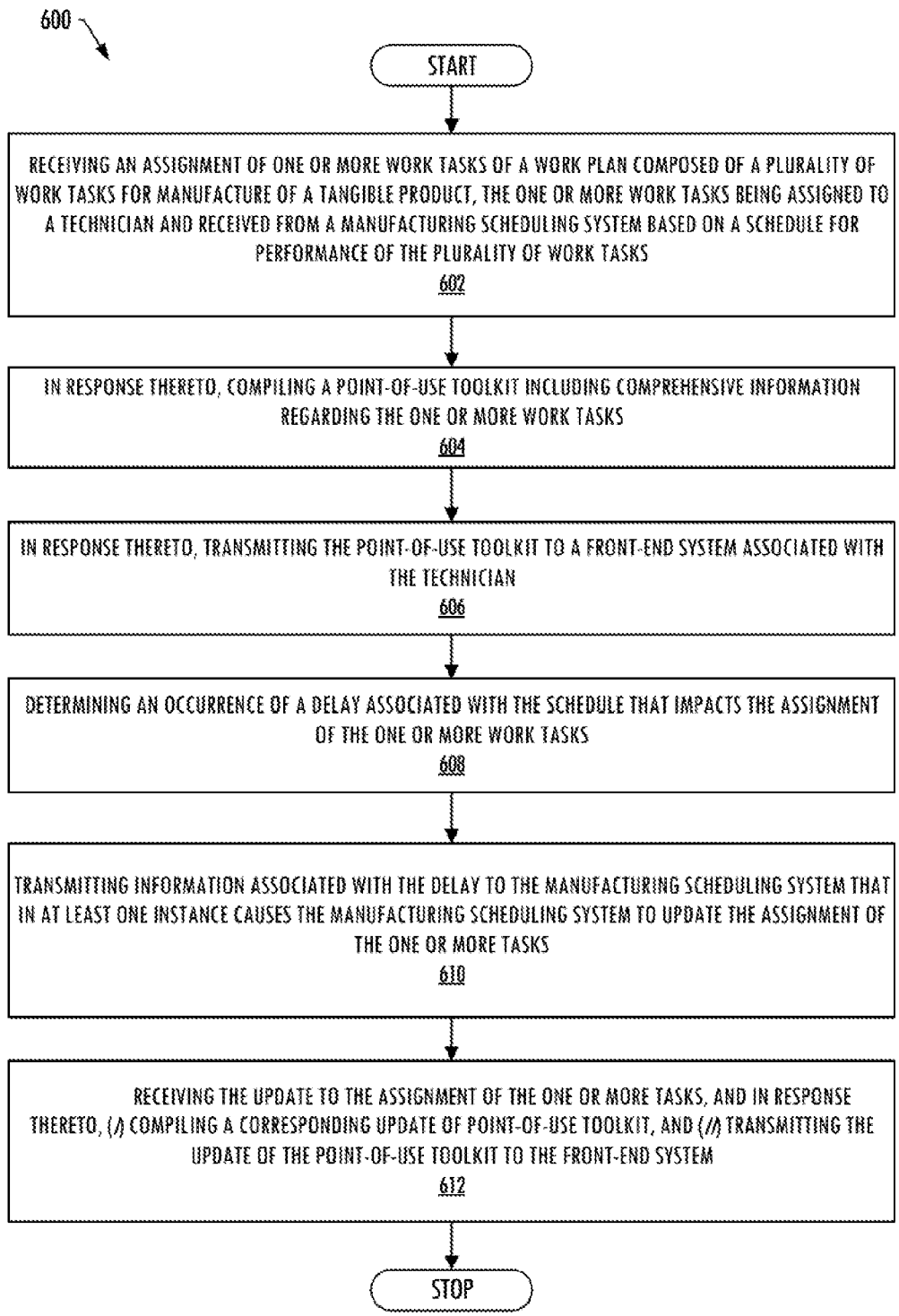
FIG. 6 is a flow diagram of a method of providing a point-of-use toolkit in accordance with an example implementation.

FIG. 6 illustrates a flowchart including operations in a method 600 of providing a point-of-use toolkit in accordance with an example implementation of the present disclosure. As shown at block 602, the method may include receiving an assignment of one or more work tasks of a work plan composed of a plurality of work tasks for manufacture of a tangible product. The work task(s) may be assigned to a technician and received from a manufacturing scheduling system based on a schedule for performance of the plurality of work tasks. In response to thereto, the method may include compiling a point-of-use toolkit including comprehensive information regarding the work task(s), as shown at block 604, and transmitting the point-of-use toolkit to a front-end system associated with the technician, as shown at block 606.

The method may also include determining an occurrence of a delay associated with the schedule that impacts the assignment of the work task(s), as shown at block 608, and transmitting information associated with the delay to the manufacturing scheduling system that in at least one instance causes the manufacturing scheduling system to update the assignment of the one or more tasks, as shown at block 610. As shown at block 612, the method may include receiving the update to the assignment of the work task(s). In response thereto, the method may include compiling a corresponding update of point-of-use toolkit based on the update to the assignment of the work task(s), and transmitting the update of the point-of-use toolkit to the front-end system.

In one example implementation, the technician and/or front-end system 101 are first authenticated based on one or more methods discussed herein. Afterwards, the back-end system may identify work task, from amongst the task received from the manufacturing scheduling system 104, that are specifically associated with the authenticated technician based at least in part on information retrieved from both the manufacturing instruction library database 108 and the application role database 106. The back-end system may further transmit information to the application role database 106 such that the authenticated technician may be identified as being associated with a particular role (e.g. an electrician, inspector, and the like). The back-end system may identify a media transmission type associated with the communicating information related to the identified work task. If the technician is connected via a traditional networked connection such as a public workstation, the back-end system may be configured to initiate a standard database connection and provide the technician with traditional work assignment menus. Alternatively, if the technician is connected via a front-end system, universal serial bus (USB) connection, smart phone, and the like, the back-end system may assemble viewing software to be loaded onto the point of use device. In some example implementations, a synchronous process is utilized to create a manifest of which types of data, display menus, and/or drivers are needed on the point of use device. The back-end system may be configured to review the concurrency and maintain a log of which software components have been distributed. In some example implementations, the software on the device will be removed and/or inaccessible after a predetermined amount of time and/or when the location of the device is determined to be outside the proximity of a certified network. The back-end system may further assemble raw information (e.g. text, graphic, and the like) to be included in the point-of-use toolkit. Assembling the raw information may comprise initially compiling and/or properly formatting data received from the manufacturing instruction library database 108 and/or the application role database 106. An encryption pass may be generated 604 and applied to the data such that in some example implementations, the encrypted data may be optionally stored in a separate database. Furthermore, a compression algorithm may be applied to the encrypted text for the purpose of optimizing data transmission. The back-end system may then update the task status associated with an identified work task, and data within the system may be synchronized and/or updated at the front-end system.

According to example implementations of the present disclosure, the system 100 and its subsystems and/or components including the front-end system 101, back-end system 102, manufacturing scheduling system 104, application role database 106 and/or manufacturing instruction library database server 108 may be implemented by various means. Similarly, the example back-end systems 200, 300, 400, and 500 including each of their respective elements may be implemented by various means according to example embodiments. Means for implementing the systems, subsystems and their respective elements may include hardware, alone or under direction of one or more computer programs from a computer-readable storage medium.

In some examples, one or more apparatuses may be provided that are configured to function as or otherwise implement the systems, subsystems, tools and respective elements shown and described herein. In examples involving more than one apparatus, the respective apparatuses may be connected to or otherwise in communication with one another in a number of different manners, such as directly or indirectly via a wired or wireless network or the like.

Figure 7:
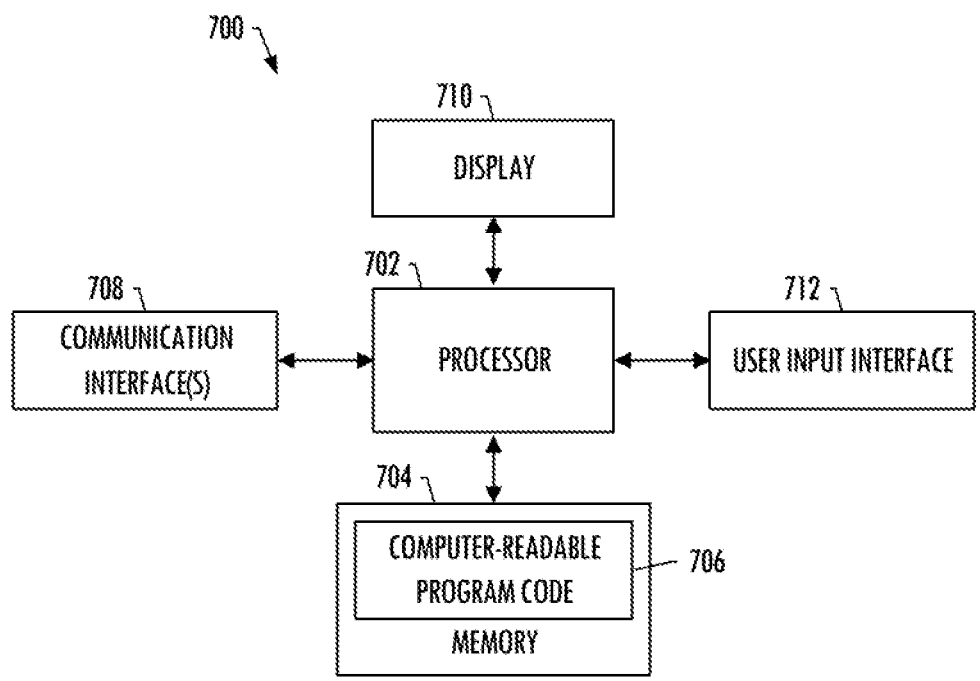
FIG. 7 illustrates an apparatus according to some example implementations.

FIG. 7 illustrates an apparatus 700 according to some example implementations of the present disclosure. Generally, an apparatus of example implementations of the present disclosure may comprise, include or be embodied in one or more fixed or portable electronic devices. Examples of suitable electronic devices include a smartphone, tablet computer, laptop computer, desktop computer, workstation computer, server computer or the like. The apparatus may include one or more of each of a number of components such as, for example, a processor 702 (e.g., processor unit) connected to a memory 704 (e.g., storage device).

The processor 702 is generally any piece of computer hardware that is capable of processing information such as, for example, data, computer programs and/or other suitable electronic information. The processor is composed of a collection of electronic circuits some of which may be packaged as an integrated circuit or multiple interconnected integrated circuits (an integrated circuit at times more commonly referred to as a "chip"). The processor may be configured to execute computer programs, which may be stored onboard the processor or otherwise stored in the memory 704 (of the same or another apparatus).

The processor 702 may be a number of processors, a multi-processor core or some other type of processor, depending on the particular implementation. Further, the processor may be implemented using a number of heterogeneous processor systems in which a main processor is present with one or more secondary processors on a single chip. As another illustrative example, the processor may be a symmetric multi-processor system containing multiple processors of the same type. In yet another example, the processor may be embodied as or otherwise include one or more application-specific integrated circuits (ASICs), field-programmable gate arrays (FPGAs) or the like. Thus, although the processor may be capable of executing a computer program to perform one or more functions, the processor of various examples may be capable of performing one or more functions without the aid of a computer program.

The memory 704 is generally any piece of computer hardware that is capable of storing information such as, for example, data, computer programs (e.g., computer-readable program code 706) and/or other suitable information either on a temporary basis and/or a permanent basis. The memory may include volatile and/or non-volatile memory, and may be fixed or removable. Examples of suitable memory include random access memory (RAM), read-only memory (ROM), a hard drive, a flash memory, a thumb drive, a removable computer diskette, an optical disk, a magnetic tape or some combination of the above. Optical disks may include compact disk-read only memory (CD-ROM), compact disk-read/write (CD-R/W), DVD or the like. In various instances, the memory may be referred to as a computer-readable storage medium. The computer-readable storage medium is a non-transitory device capable of storing information, and is distinguishable from computer-readable transmission media such as electronic transitory signals capable of carrying information from one location to another. Computer-readable medium as described herein may generally refer to a computer-readable storage medium or computer-readable transmission medium.

In addition to the memory 704, the processor 702 may also be connected to one or more interfaces for displaying, transmitting and/or receiving information. The interfaces may include a communications interface 708 (e.g., communications unit) and/or one or more user interfaces. The communications interface may be configured to transmit and/or receive information, such as to and/or from other apparatus(es), network(s) or the like. The communications interface may be configured to transmit and/or receive information by physical (wired) and/or wireless communications links. These wireless communication links in particular may be configured to implement any of a number of different radio access technologies such as any of a number of 3GPP or 4GPP radio access technologies, UMTS UTRA, GSM radio access technologies, CDMA 2000 radio access technologies, WLANs (e.g., IEEE 802.xx, e.g., 802.11a, 802.11b, 802.11g, 802.11n), WiMAX, IEEE 802.16, wireless PANs (WPANs) (e.g., IEEE 802.15, Bluetooth®, low power versions of Bluetooth®, IrDA, UWB, Wibree, Zigbee®), near-field communication technologies, and the like. Examples of suitable communication interfaces include a network interface controller (NIC), wireless NIC (WNIC), infrared interfaces, laser interfaces, light based interfaces, vibration interfaces, other wireless forms of data transmissions, body area networks, local area networks, conductors embodied by a human body, or the like.

The user interfaces may include a display 710 and/or one or more user input interfaces 712 (e.g., input/output unit). The display may be configured to present or otherwise display information to a user (technician), and in some examples may include the display device of a wearable (e.g., head-mounted) or handheld personal display system. Examples of suitable personal display systems may include private, private-shared (linked private) or public personal display systems such as those provided in the form of eyeglasses, safety goggles, contact lenses and the like, image projectors, video projectors, any of a number of other active or passive display systems, laser pointers and the like. In other examples, the display device may include a more conventional display device such as a liquid crystal display (LCD), light-emitting diode display (LED), plasma display panel (PDP) or the like, which may or may not take the form of a personal display system (e.g., smartphone, tablet computer).

The user input interfaces 712 may be wired or wireless, and may be configured to receive information from a user into the apparatus, such as for processing, storage and/or display. Suitable examples of user input interfaces include a microphone, image or video capture device, keyboard or keypad, joystick, touch-sensitive surface (separate from or integrated into a touchscreen), biometric sensor or the like. The user interfaces may further include one or more interfaces for communicating with peripherals such as printers, scanners or the like.

As indicated above, program code instructions may be stored in memory, and executed by a processor, to implement functions of the systems, subsystems, tools and their respective elements described herein. As will be appreciated, any suitable program code instructions may be loaded onto a computer or other programmable apparatus from a computer-readable storage medium to produce a particular machine, such that the particular machine becomes a means for implementing the functions specified herein. These program code instructions may also be stored in a computer-readable storage medium that can direct a computer, a processor or other programmable apparatus to function in a particular manner to thereby generate a particular machine or particular article of manufacture. The instructions stored in the computer-readable storage medium may produce an article of manufacture, where the article of manufacture becomes a means for implementing functions described herein. The program code instructions may be retrieved from a computer-readable storage medium and loaded into a computer, processor or other programmable apparatus to configure the computer, processor or other programmable apparatus to execute operations to be performed on or by the computer, processor or other programmable apparatus.

Retrieval, loading and execution of the program code instructions may be performed sequentially such that one instruction is retrieved, loaded and executed at a time. In some example implementations, retrieval, loading and/or execution may be performed in parallel such that multiple instructions are retrieved, loaded, and/or executed together. Execution of the program code instructions may produce a computer-implemented process such that the instructions executed by the computer, processor or other programmable apparatus provide operations for implementing functions described herein.

Execution of instructions by a processor, or storage of instructions in a computer-readable storage medium, supports combinations of operations for performing the specified functions. In this manner, an apparatus 700 may include a processor 702 and a computer-readable storage medium or memory 704 coupled to the processor, where the processor is configured to execute computer-readable program code 706 stored in the memory. It will also be understood that one or more functions, and combinations of functions, may be implemented by special purpose hardware-based computer systems and/or processors which perform the specified functions, or combinations of special purpose hardware and program code instructions.

Many modifications and other implementations of the disclosure set forth herein will come to mind to one skilled in the art to which the disclosure pertains having the benefit of the teachings presented in the foregoing description and the associated drawings. Therefore, it is to be understood that the disclosure is not to be limited to the specific implementations disclosed and that modifications and other implementations are intended to be included within the scope of the appended claims. Moreover, although the foregoing description and the associated drawings describe example implementations in the context of certain example combinations of elements and/or functions, it should be appreciated that different combinations of elements and/or functions may be provided by alternative implementations without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. An apparatus for implementation of a back-end system for providing a point-of-use toolkit, the apparatus comprising a processor and a memory storing executable instructions that, in response to execution by the processor, cause the apparatus to implement at least:
   a loading and synchronization system configured to:
      receive an assignment of one or more work tasks of a work plan composed of a plurality of work tasks for manufacture of a tangible product, the one or more work tasks being assigned to a technician and received from a manufacturing scheduling system based on a schedule for performance of the plurality of work tasks; and in response to thereto,
      compile a point-of-use toolkit including comprehensive information regarding the one or more work tasks, including the loading and synchronization system being configured to encode the point-of-use toolkit in a format that is viewable on any of a plurality of front-end systems having different operating systems; and
      transmit the point-of-use toolkit to a front-end system of the plurality of front-end systems associated with the technician;
   a device and compatibility system configured to:
      associate the front-end system with a viewer of a plurality of viewers, the viewer or the point-of-use toolkit being developed according to an architecture that is operating system independent and thus configured for compatibility with any of the different operating systems; and
   a schedule interruption system operatively coupled to the loading and synchronization system, and configured to:
      determine an occurrence of a delay associated with the schedule after the initiation of the one or more work tasks by the technician, wherein the delay impacts the assignment of the one or more work tasks, and wherein in at least one instance the occurrence of the delay is determined independent of user-input and based on information automatically retrieved from one or more of the manufacturing scheduling system, a manufacturing instructions library, a parts distribution database, or a tools distribution database; and
      transmit information associated with the delay to the manufacturing scheduling system that in at least one instance causes the manufacturing scheduling system to update the assignment of the one or more tasks during execution of the one or more work tasks by the technician and based at least in part on the information associated with the delay,
   wherein the loading and synchronization system is configured to receive the update to the assignment of the one or more tasks, and in response thereto, (i) compile a corresponding update of the point-of-use toolkit, and (ii) transmit the update of the point-of-use toolkit to the front-end system in real-time during the execution of the one or more work tasks by the technician.

2. The apparatus of claim 1, wherein the schedule interruption system being configured to determine the occurrence of the delay includes being configured to determine the occurrence of the delay based on at least one of (i) user input received from the technician via the front-end system, or from another technician via another front-end system, or (ii) information automatically retrieved from one or more of the manufacturing scheduling system, a manufacturing instructions library, a parts distribution database, or a tools distribution database.

3. The apparatus of claim 1, wherein the loading and synchronization system being configured to transmit the update of the point-of-use toolkit includes being configured to cause the front-end system to alert the technician upon receipt of the updated point-of-use toolkit by the front-end system.

4. The apparatus of claim 1, wherein the loading and synchronization system being configured to compile the point-of-use toolkit includes being configured to:
   determine a role associated with the technician based at least in part on data retrieved from an application role database including technician roles' and certification data; and
   compile the point-of-use toolkit based on the role associated with the technician, the toolkit in different instances including different comprehensive information regarding the one or more tasks for different technicians associated with different roles.

5. The apparatus of claim 1, wherein the loading and synchronization system being configured to compile the point-of-use toolkit includes being configured to:
   retrieve manufacturing instructions from a manufacturing instructions library, the manufacturing instructions including information that describe one or more activities of the one or more work tasks; and
   compile the point-of-use toolkit, the comprehensive information of which includes the manufacturing instructions.

6. The apparatus of claim 1, wherein the memory stores further executable instructions that, in response to execution by the processor, cause the apparatus to further implement a security system configured to:
   determine a location of the front-end system; and
   restrict access to the point-of-use toolkit and the update thereof, via the front-end system, in an instance in which the location of the front-end system is outside a perimeter of an authorized work area associated with the one or more work tasks.

7. A method for providing a point-of-use toolkit, the method comprising:
   receiving an assignment of one or more work tasks of a work plan composed of a plurality of work tasks for manufacture of a tangible product, the one or more work tasks being assigned to a technician and received from a manufacturing scheduling system based on a schedule for performance of the plurality of work tasks; and in response to thereto,
   compiling a point-of-use toolkit including comprehensive information regarding the one or more work tasks, including encoding the point-of-use toolkit in a format that is viewable on any of a plurality of front-end systems having different operating systems; and
   transmitting the point-of-use toolkit to a front-end system of the plurality of front-end systems associated with the technician;
   associating the front-end system with a viewer of a plurality of viewers, the viewer or the point-of-use toolkit being developed according to an architecture that is operating system independent and thus configured for compatibility with any of the different operating systems;
   determining an occurrence of a delay associated with the schedule after the initiation of the one or more work tasks by the technician, wherein the delay impacts the assignment of the one or more work tasks, and wherein in at least one instance the occurrence of the delay is determined independent of user-input and based on information automatically retrieved from one or more of the manufacturing scheduling system, a manufacturing instructions library, a parts distribution database, or a tools distribution database;

transmitting information associated with the delay to the manufacturing scheduling system that in at least one instance causes the manufacturing scheduling system to update the assignment of the one or more tasks during execution of the one or more work tasks by the technician and based at least in part on the information associated with the delay;

receiving the update to the assignment of the one or more tasks, and in response thereto, (i) compiling a corresponding update of the point-of-use toolkit, and (ii) transmitting the update of the point-of-use toolkit to the front-end system in real-time during the execution of the one or more work tasks by the technician.

8. The method of claim 7, wherein determining the occurrence of the delay includes determining the occurrence of the delay based on at least one of (i) user input received from the technician via the front-end system, or from another technician via another front-end system or (ii) information automatically retrieved from one or more of the manufacturing scheduling system, a manufacturing instructions library, a parts distribution database, or a tools distribution database.

9. The method of claim 7, wherein transmitting the update of the point-of-use toolkit includes causing the front-end system to alert the technician upon receipt of the updated point-of-use toolkit by the front-end system.

10. The method of claim 7, wherein compiling the point-of-use toolkit includes:

determining a role associated with the technician based at least in part on data retrieved from an application role database including technician roles' and certification data; and compiling the point-of-use toolkit based on the role associated with the technician, the toolkit in different instances including different comprehensive information regarding the one or more tasks for different technicians associated with different roles.

11. The method of claim 7, wherein compiling the point-of-use toolkit includes:

retrieving manufacturing instructions from a manufacturing instructions library, the manufacturing instructions including information that describe one or more activities of the one or more work tasks; and compiling the point-of-use toolkit, the comprehensive information of which includes the manufacturing instructions.

12. The method of claim 7 further comprising:

determining a location of the front-end system; and restricting access to the point-of-use toolkit and the update thereof, via the front-end system, in an instance in which the location of the front-end system is outside a perimeter of an authorized work area associated with the one or more work tasks.

13. A computer-readable storage medium for providing a point-of-use toolkit, the computer-readable storage medium being non-transitory and having computer-readable program code portions stored therein that in response to execution by a processor, cause an apparatus to at least:

receive an assignment of one or more work tasks of a work plan composed of a plurality of work tasks for manufacture of a tangible product, the one or more work tasks being assigned to a technician and received from a manufacturing scheduling system based on a schedule for performance of the plurality of work tasks; and in response to thereto, compile a point-of-use toolkit including comprehensive information regarding the one or more work tasks, including the apparatus being configured to encode the point-of-use toolkit in a format that is viewable on any of a plurality of front-end systems having different operating systems; and transmit the point-of-use toolkit to a front-end system of the plurality of front-end systems associated with the technician;

associate the front-end system with a viewer of a plurality of viewers, the viewer or the point-of-use toolkit being developed according to an architecture that is operating system independent and thus configured for compatibility with any of the different operating systems;

determine an occurrence of a delay associated with the schedule after the initiation of the one or more work tasks by the technician, wherein the delay impacts the assignment of the one or more work tasks, and wherein in at least one instance the occurrence of the delay is determined independent of user-input and based on information automatically retrieved from one or more of the manufacturing scheduling system, a manufacturing instructions library, a parts distribution database, or a tools distribution database;

transmit information associated with the delay to the manufacturing scheduling system that in at least one instance causes the manufacturing scheduling system to update the assignment of the one or more tasks during execution of the one or more task by the technician and based at least in part on the information associated with the delay;

receive the update to the assignment of the one or more tasks, and in response thereto, (i) compiling a corresponding update of the point-of-use toolkit, and (ii) transmitting the update of the point-of-use toolkit to the front-end system in real-time during the execution of the one or more work tasks by the technician.

14. The computer-readable storage medium of claim 13, wherein the apparatus being caused to determine the occurrence of the delay includes being caused to determine the occurrence of the delay based on at least one of (i) user input received from the technician via the front-end system, or from another technician via another front-end system or (ii) information automatically retrieved from one or more of the manufacturing scheduling system, a manufacturing instructions library, a parts distribution database, or a tools distribution database.

15. The computer-readable storage medium of claim 13, wherein the apparatus being caused to transmit the update of the point-of-use toolkit includes being caused to cause the front-end system to alert the technician upon receipt of the updated point-of-use toolkit by the front-end system.

16. The computer-readable storage medium of claim 13, wherein the apparatus being caused to compile the point-of-use toolkit includes being caused to:

determine a role associated with the technician based at least in part on data retrieved from an application role database including technician roles' and certification data; and compile the point-of-use toolkit based on the role associated with the technician, the point-of-use toolkit in different instances including different comprehensive information regarding the one or more tasks for different technicians associated with different roles.

17. The computer-readable storage medium of claim 13, wherein the apparatus being caused to compile the point-of-use toolkit includes being caused to:

retrieve manufacturing instructions from a manufacturing instructions library, the manufacturing instructions including information that describe one or more activities of the one or more work tasks; and compile the point-of-use toolkit, the comprehensive information of which includes the manufacturing instructions.

18. The computer-readable storage medium of claim 13 having further computer-readable program code portions stored therein that in response to execution by the processor, cause the apparatus to further:

determine a location of the front-end system; and restrict access to the point-of-use toolkit and the update thereof, via the front-end system, in an instance in which the location of the front-end system is outside a perimeter of an authorized work area associated with the one or more work tasks.

* * * * *